United States Patent [19]

Pálmason

[11] Patent Number: 4,503,588
[45] Date of Patent: Mar. 12, 1985

[54] APPARATUS FOR CUTTING FISH HEADS

[75] Inventor: Jón A. Pálmason, Reykjavik, Iceland

[73] Assignee: Kvikk s.f., Reukjavik, Iceland

[21] Appl. No.: 448,725

[22] Filed: Dec. 10, 1982

[30] Foreign Application Priority Data

Nov. 26, 1982 [DE] Fed. Rep. of Germany ....... 5293/82

[51] Int. Cl.$^3$ ............................................. A22C 25/18
[52] U.S. Cl. ........................................................ 17/61
[58] Field of Search ................... 17/61, 63, 71, 56, 53, 17/59, 58

[56] References Cited

U.S. PATENT DOCUMENTS

| 1,331,932 | 2/1920 | Kloster et al. | 17/58 |
| 1,476,893 | 12/1923 | Jagger | 17/61 |
| 2,292,696 | 8/1942 | Jensen | |
| 2,466,614 | 4/1949 | Rivers | 17/58 |
| 2,822,569 | 2/1958 | Gradoff et al. | 17/56 |
| 3,123,853 | 3/1964 | Radloff et al. | 17/63 |
| 3,925,846 | 12/1975 | Leander | 17/58 X |
| 4,091,506 | 5/1978 | Soerensen et al. | 17/58 X |

FOREIGN PATENT DOCUMENTS

| 482861 | 4/1952 | Canada | 17/61 |
| 6379 | 12/1974 | Denmark | |
| 1177783 | 9/1964 | Fed. Rep. of Germany | |
| 1292340 | 4/1969 | Fed. Rep. of Germany | |
| 2133680 | 1/1973 | Fed. Rep. of Germany | |
| 2855127 | 12/1979 | Fed. Rep. of Germany | |
| 2276786 | 1/1976 | France | |
| 83637 | 8/1971 | German Democratic Rep. | 17/53 |
| 131895 | 8/1978 | German Democratic Rep. | 17/61 |
| 405421 | 2/1934 | United Kingdom | 17/61 |

Primary Examiner—Willie G. Abercrombie
Attorney, Agent, or Firm—Dennison, Meserole, Pollack & Scheiner

[57] ABSTRACT

An apparatus for cutting fish heads comprises an elongated channel member, one or more cutting knives extending into a channel defined in the channel member, and spiked belts or other means for moving fish heads along the channel past the cutting knife or knives. The apparatus may also comprise a head supporting rail on which the fish heads to be cut may be threaded so that they are maintained in a desired relation to the knife or knives. The fish heads may be split in two parts, cut along their nape and skull portion, or separated into various desired parts, such as a nape and skull portion and a chin and cheek portion.

14 Claims, 4 Drawing Figures

APPARATUS FOR CUTTING FISH HEADS

BACKGROUND OF THE INVENTION

Fish heads or certain parts thereof may be used for human consumption and/or for feeding animals. Before the tubular fish heads are preserved, for example by drying, salting, or freezing, they are normally split in two or cut up. This has hitherto been done manually by means of axes or knives. It may also be desired to separate the various parts of a fish head, such as the nape and skull portion, and the chin and cheek portion. These various parts may be used for several purposes. Thus, for example the chin and cheek portions may be used for the preparation of various dishes or minced fish meat. However, separation of the various parts of a fish head by manual cutting involves a high degree of labor, whereby utilization of fish heads for human consumption may be considered uneconomical.

SUMMARY OF THE INVENTION

The present invention provides an apparatus by means of which fish heads may be split, cut up, or divided into desired parts with the use of a minimum of manual labor.

Thus, the present invention provides an apparatus for cutting fish heads, said apparatus comprising elongated guide means, means for consecutively moving the fish heads in their longitudinal direction along a path defined by the guide means, and cutting means extending into the path of movement of the fish heads so as to cut the respective fish heads longitudinally when passing the cutting means. When the fish heads to be cut are fed manually or mechanically one by one to the guide means and into engagement with the moving means, they are forced to follow the said path of movement determined by the guide means past the cutting means, so that the heads are cut by the latter. Dependent on the location of the cutting means in relation to the path of movement of the fish heads, the fish heads are split in two, cut up, for example along their nape and skull portion, or divided into the desired parts.

The guide means may be of any type which are able to guide the tubular fish heads along the desired path of movement. In a preferred embodiment, however, the guide means comprise a member defining a channel therein for slidingly receiving at least part of each fish head. As an example, the channel may receive the nape and skull portion of each fish head. Alternatively, the channel may be adapted to receive the chin and cheek portions of the heads.

The term "channel" used in this specification should be interpreted very broadly so as to include, for example, channels with various cross-sectional shapes and with part of the bottom wall of the channel cut away. The term should, for example, also comprise a path of movement defined by a pair of spaced, downwardly converging side walls or surfaces and without any bottom wall or surface.

The moving means by means of which the fish heads are consecutively moved along the path defined by the guide means and past the cutting means, may be of any suitable type, for example a reciprocating pushing member, which may retain each fish head in proper engagement with the channel and push one head at the time along the guide means, towards and past the cutting means. In the preferred embodiment, however, the moving means comprise endless belts or chains extending along the channel on either side therof, said belts or chains having spikes extending from the outer surfaces thereof for engaging with portions of the fish heads extending laterally outside the channel. Fish heads may then be fed continuously into the channel at a head receiving position and move along the channel in a row towards and past the cutting means, and the spikes of the belts or chains may penetrate into the laterally extending portions of the fish heads so as to prevent any slipping between the belts and the heads. In order to allow the spikes to pierce the latterally extending portions of the fish heads, longitudinally extending grooves or slots may be defined on either side of the channel for receiving the outer free end of the spikes on the adjacent belt or chain.

When the moving means engage with the heads received in the channel defined by the guide means, they tend to flatten the tubular fish heads, so that it may be difficult to avoid total splitting of the fish heads, even when it is desired to cut only the nape and skull portions and not the chin portion. Therefore, it may be desired to move the tubular fish heads along the channel of the guide means in a distended condition, whereby the fish heads may be cut more accurately at the desired positions. Thus, according to the invention the guide means may comprise a head supporting rail extending opposite to and along the channel in substantially parallel relationship therewith so as to allow the fish heads, each having a mouth opening, to be threaded on the rail so as to encircle the same, and to slide along the rail when they are moved along the channel by the moving means.

The guide means may comprise head distending means located adjacent to the cutting means, for further distending the fish heads, especially in the general direction of extension of the cutting means or knives, when the fish heads pass the cutting means, whereby the fish heads may be cut more accurately.

Normally, the channel is upwardly open, and the cutting means may then extend upwardly into the channel through a first slot or opening defined in a bottom wall of the channel member. The cutting means may extend upwardly to a position between the bottom wall of the channel member and the lower part of the supporting rail, whereby the fish heads are cut only along the portions engaging with the bottom wall of the channel member, for example along the nape and skull portions. In case it is desired to split the fish heads in two, the cutting means may extend further upwardly into a second opening or slot aligned with said first opening or slot and defined in the rail. In these cases, the cutting means are normally a single cutting knife extending along a central longitudinal plane of the channel.

In an alternative embodiment the cutting means comprise a pair of cutting knives defining therebetween an angle having its apex positioned adjacent to the upper ends of the knives. This pair of cutting knives may then be positioned in relation to the path of movement of the fish heads so as to cut each fish head along two angularly positioned planes. Thus, for example, the two cutting knives may be positioned so as to cut the nape and skull portion from the chin and cheek portion of each fish head.

It may be desired to separate the gills from the chin and cheek portion of each of the fish heads. For that purpose the free end of the rail at which the fish heads are threaded, may be bifurcated. When a fish head is threaded on the supporting rail with the nape and skull portion directed downwardly, the bifurcated end of the rail is inserted into the mouth opening of the fish head, and each of the arms forming the bifurcated free end of the rail may then engage behind the adjacent gills, so that the connections between the gills and the chin portion are torn when the head is moved along the supporting rail by the moving means.

In order to separate the gills or possible gill residues from the chin portion of the head, the cutting means may comprise a cutting edge located at the upper side of the rail cutting such gill residues adjacent to the tongue of each fish head passing along the rail.

In order to facilitate feeding of the heads onto the rail, the free end portion of the supporting rail, where the heads are threaded on the rail, may be inclined upwardly, for example by about 20° in relation to a horizontal plane.

The channel member and the supporting rail may be fixedly, but adjustably mounted in relation to each other, and the lateral distance between the bottom wall of the channel member and the supporting rail may then be adjusted to the size of the fish heads being treated. However, the size of the fish heads may vary substantially, so that sorting of the heads with respect to size may be necessary. In order to avoid such sorting of the fish heads to be treated, the channel member may be mounted by resilient supporting means, whereby the transverse distance between the rail and the channel member may be increased by overcoming the bias of the resilient supporting means. Consequently, the distance between the rail and the channel member may vary in accordance with the sizes of the fish heads being treated.

BRIEF DESCRIPTION OF THE DRAWINGS

The invention will now be further described with reference to the drawings, wherein.

DESCRIPTION OF PREFERRED EMBODIMENTS

Figures 1, 2:
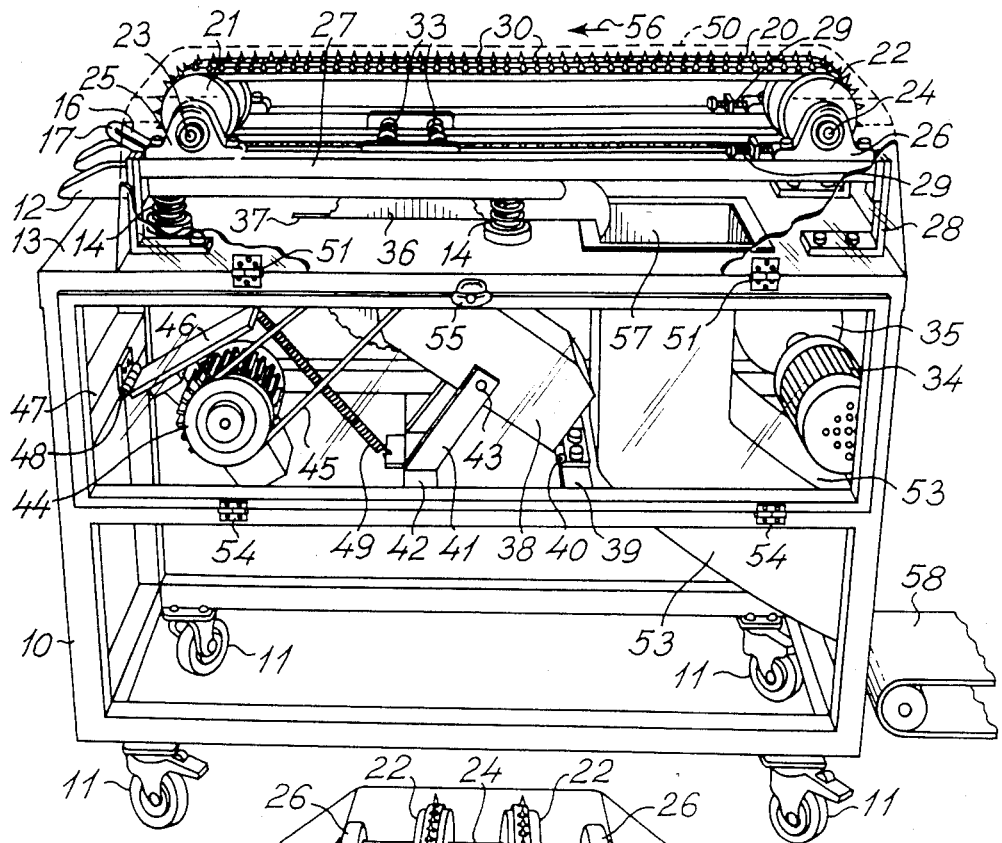
FIG. 1 is a perspective side view of a preferred embodiment of the apparatus according to the invention.
FIG. 2 is a perspective end view of the apparatus shown in FIG. 1.

The apparatus shown in FIGS. 1 and 2 for cutting fish heads comprises a frame 10 which is movably supported by caster wheels 11. A centrally arranged and longitudinally extending channel member 12 is arranged above an upper top panel 13 of the frame 10 by means of coil springs 14, or other resilient supporting means. The channel member 12 defines a longitudinally extending, upwardly open channel 15 therein for receiving fish heads to be cut. A head supporting rail 16, which is fixedly mounted on the top panel 13, extends immediately above and along the channel 15. In the embodiment shown in FIGS. 1 and 2, the supporting rail 16 is formed by a round bar having a circular bend 17 at its forward or inlet end, and a pair of slightly laterally spaced legs have their free ends interconnected by a connecting plate 18, which is arranged on the upper side of the legs and provided with a cutting edge 19. A pair of laterally spaced, endless V-belts 20 extend along the channel 15 on either side thereof. Each belt is passed around a pair of pulleys 21 and 22, which are fixedly mounted on shafts 23 and 24, respectively. Each of the shafts 23 and 24 is rotatably mounted in a pair of bearings 25 and 26, respectively. The bearings are mounted on longitudinally extending supporting beams 27, each of which is mounted on the top panel 13 of the frame 10 by means of a pair of angular brackets 28. The longitudinal distance between the bearings 25 and 26 and, consequently, the tightness of the belts 20 is adjustable by means of adjusting members 29. Each of the belts 20 is provided with a plurality of outwardly extending spikes 30, and the spikes on the lower runs of the belts 20 may extend into a pair of narrow grooves or channels 31, which are formed in the upper surfaces of the channel member 12, and which extend on either side of the channel 15. The lower runs of the belts 20 and the spikes 30 thereon may be maintained in proper engagement with the grooves 31 by a hold-down device 32 comprising rollers 33 engaging with the upper sides of the lower runs of the belts 20.

The shaft 24 and, consequently, the belts 20, is driven by an electric gear motor 34 mounted on the frame 10 below the top panel 13, through a suitable drive 35, which may, for example, include a chain-and-sprocket drive. A circular knife 36 is rotatably mounted below the top panel 13, so that the upper part of the knife extends upwardly through a slot 37 in the top panel 13 and an aligned opening or slot in the bottom part of the channel member 12, so that the upper part of the knife 36 extends into the channel 15 along the central plane thereof. The knife 36 is rotatably mounted in a mounting structure 38 which is connected to a transverse bracing 39 of the frame 10 by means of a hinge connection 40. The angular position of the mounting structure 38 and, consequently, the level of the upper part of the knife 36 within the channel 15 may be adjusted, and the structure 38 may be maintained in the desired position by means of a bracket 41, which is fastened to a transverse bracing 42 of the frame 10. The bracket 41 may embrace the mounting structure 38 and be releasably connected thereto by releasable locking means, which may, for example, comprise locking pins 43, which may be inserted in any of a number of corresponding holes formed in the structure 38. The knife 36 may be rotated by an electric motor 44 through a belt drive 45, and the motor 44 is mounted on a mounting plate 46 connected to a transverse bracing 47 of the frame 10 by a hinge 48. The mounting plate 46 and the motor 44 mounted thereon is biased downwardly by a coil spring 49 extending between the free end of the mounting plate 46 and the bracing 42, whereby tension of the belt drive 45 may be maintained substantially unchanged when the level of the knife 36 is adjusted.

The apparatus parts positioned above the top panel 13 may be covered by a hood or cover 50, which is connected to the frame 10 by means of a pair of hinges 51. The cover or hood 50 has an end opening 52 so that the forward, circular bend 17 of the supporting rail 16 and the adjacent end of the channel 15 is accessible. The opposite sides of the frame 10 may also be closed by side panels 53, which are hinged to the frame by means of hinges 54 and provided with a locking member 55.

The apparatus discribed above and shown in FIGS. 1 and 2 operates as follows:

When the electric motors 34 and 44 are energized, the belts are moved in a direction indicated by an arrow 56 in FIG. 1, and the knife 36 is rotated. Fish heads to be cut may now sucessively be positioned in the channel 15 with their nape and skull portions facing downwardly, while the circular bend 17 of the supporting rail 16 is inserted into the mouth opening of each fish head. Laterally extending parts of the fish head will now come into engagement with the spikes 30 of the moving belts 20, so that each fish head is moved along the channel 15 while encircling the rail 16, which supports the chin portion of the fish head at a predetermined level. When the fish head passes the rotating knife 36, it will be cut longitudinally. If the knife is adjusted so that its upper part is positioned immediately below the rail 16, only the nape and scull portions are cut, and when the cut fish head passes the cutting edge 19 of the plate 18 with the chin portion stretched between the lower runs of the belts 20, the gills are cut from the chin and cheek portion. The cut fish heads leaving the supporting rail 16 may fall down through a chute 57, which may, for example, pass the treated fish heads to a conveyor belt 58 moving the heads to a storage site or to a location for possible further treatment.

The knife 36 may be adjusted so that the upper part thereof extends above the level of the rail 16. In that case each fish head passing the knife is split in two parts. As mentioned above, the supporting rail 16 may be fixedly mounted in relation to the frame 10, while the channel member 12 is resiliently supported by the coil springs 14. This means that the vertical distance between the rail 16 and the surfaces defining the channel 15 is automatically adjusted and adapted to the sizes of the fish heads being treated.

Figure 3:
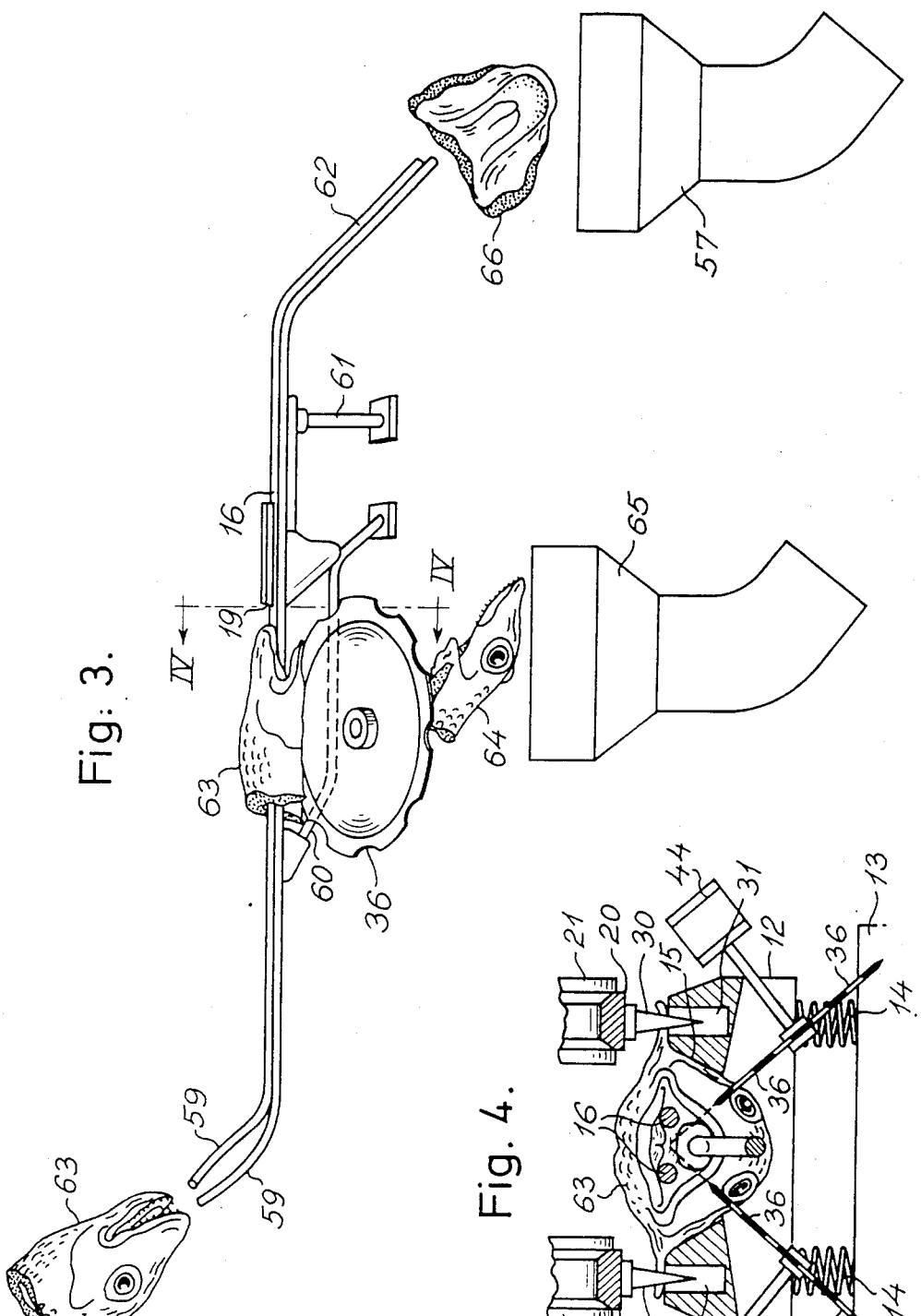
FIG. 3 is a side view of a modified embodiment of the supporting rail.
Figure 4:
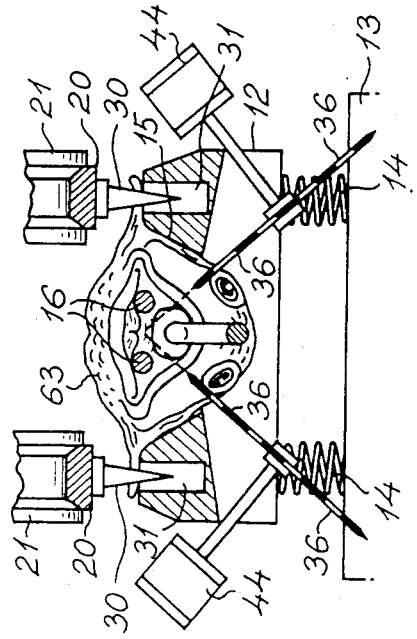
FIG. 4 is a cross-sectional view along the line IV—IV in FIG. 3.

FIGS. 3 and 4 illustrate a modified embodiment of the head supporting rail 16 and the arrangement of the circular cutting knife 36, and in FIGS. 3 and 4 the parts corresponding to similar parts in FIGS. 1 and 2 have been designated the same reference numerals.

In FIGS. 3 and 4 the head supporting rail 16 has an upwardly inclined, bifurcated forward or inlet end with two latterally spaced arms 59, and the rail 16 is fixedly mounted on the frame 10 (not shown in FIG. 3) by means of mounting members 60 and 61. The rail member 16 ends into a downwardly inclined discharge end 62, which is directed towards the inlet opening of the chute 57.

As shown in FIG. 4 the single, centrally arranged knife 36 used in connection with the embodiment of FIGS. 1 and 2, are replaced by a pair of obliquely arranged, circular knives 36 forming therebetween an acute or almost right angle having its apex positioned adjacent to the rail 16. The knives 36 may be individually driven by electric motors 44 as indicated in FIG. 4, or the two knives may be driven by a common electric motor through a suitable drive.

A fish head 63 to be cut may be fed into the apparatus with the chin portion facing upwards, and the arms 59 of the bifurcated end of the supporting rail 16 is then inserted into the mouth opening of the head 63. The arms 59 will then come into engagement with the gills of the fish head, and the spikes 30 of the belts 20 engage with latterally extending parts of the head. As the head 63 is forcibly moved along the channel member 12 by means of the belts 20, the gills will be retained by the arms 59 and torn off from the chin and cheek portion of the head 63. When the fish head 63 passes the obliquely positioned cutting knives 36, the nape and scull portion 64 of the fish head with attached gills will be cut and separated from the fish head, and, thereafter, this separated portion may fall down into a chute 65, which may pass it to a desired receptacle or conveyor, not shown.

As shown in FIG. 3 the mounting member 60 may be positioned between the knives 36 and shaped so as to function as a fish head distending member, which is passed into the mouth opening of the fish head and distends the fish head in a vertical direction, whereby a more accurate cutting of the head may be obtained. The remaining chin and cheek portion 66 continues its movement along the rail 16 past the cutting edge 19, which cut possible gill residues from the chin and cheek portion 66. When the latter has reached the discharge end 62 of the rail 16, it is disengaged from the spikes 30 of the belts 20 and falls down into the chute 57. Thus, the modified embodiment of the apparatus illustrated in FIGS. 3 and 4 makes it possible to obtain a mechanical separation of a fish head 63 into a nape and skull portion 64 freed from gills, and a chin and cheek portion 66. Thereby it is possible to obtain a higher degree of utilization of fish heads, which may otherwise be considered more or less without value.

It should be understood, that various modifications of the embodiment described above may be made within the scope of the present invention. Thus, for example, the circular, rotating knife or knives may be replaced by a reciprocating knife or by reciprocating knives. Furthermore, in case the fish heads are only to be split in two parts, the head supporting rail 16 may be omitted, if desired.

EXAMPLE

The diameter of the cutting knife or the cutting knives 36 may, for example be in the range from 140 to 420 mm and rotate with a speed of 1500-6000 rpm. The spike belts 20 may then be moved at a rate of 30-100 m per minute, and it will then be possible to cut 1200-1500 fish heads per hour.

What is claimed is:

1. An apparatus for cutting fish heads into at least two parts, said apparatus comprising;
   guide means including an elongated head supporting rail means,
   means for consecutively moving the fish heads, which have been threaded onto the head supporting rail means, along said rail means,
   gill separating means mounted on the supporting rail means for engaging with the gills of the fish heads being passed along the supporting rail means, so as to separate the gills from the fish heads at least at one end of the gills, and
   cutting means extending into the path of movement of the fish heads so as to longitudinally cut the respective fish heads passing the cutting means, whereby more valuable fish head parts may be separated from less valuable head parts.

2. An apparatus according to claim 1, wherein the guide means further comprise a member defining a channel therein for slidingly receiving at least part of each fish head.

3. An apparatus according to claim 2, wherein the moving means comprise endless belts or chains extending along the channel on either sides thereof, said belts or chains having spikes extending from the outer surfaces thereof for engaging with portions of the fish heads extending laterally outside the channel.

4. An apparatus according to claim 3, wherein longitudinally extending grooves or slots are defined on either side of the channel for receiving the outer free ends of the spikes on the adjacent belt or chain.

5. An apparatus according to claim 2 wherein the head supporting rail means extends opposite to and along the channel in substantially parallel relationship therewith.

6. An apparatus according to claim 5, wherein each cutting means extend upwardly into the channel through a slot or opening defined in a bottom wall of the channel member.

7. An apparatus according to claim 1, wherein the guide means comprise head distending means located adjacent to the cutting means for distending the fish heads when passing the cutting means.

8. An apparatus according to claim 6, wherein the cutting means extend further upwardly into a second opening or slot aligned with said first opening or slot and defined in the rail.

9. An apparatus according to 5, wherein the cutting means comprise a pair of cutting knives defining therebetween an angle having its apex positioned adjacent to the upper ends of the knives.

10. An apparatus according to claim 1 wherein the gill separating means comprises a bifurcated free end portion of the rail at which the fish heads are threaded.

11. An apparatus according to claim 1, wherein the gill separating means comprise a cutting edge located at the upper side of the rail for cutting the gills adjacent to the chin and cheek portion of the fish heads passing along the rail.

12. An apparatus according to claim 10, wherein the bifurcated free end portion of the supporting rail is inclined upwardly.

13. An apparatus according to claim 5, wherein the channel member is mounted by resilient supporting means whereby the transverse distance between the rail and the channel member may be increased by overcoming the bias of the resilient supporting means.

14. An apparatus according to claim 5, wherein said cutting means comprise at least one circular rotatable knife.

* * * * *